(12) United States Patent
Kenalty et al.

(10) Patent No.: US 8,365,326 B2
(45) Date of Patent: Feb. 5, 2013

(54) EVACUATION SLED FOR NON-AMBULATORY PATIENTS

(76) Inventors: Christopher Kenalty, Toronto (CA); Miriam Gordon, Toronto (CA)

( * ) Notice: Subject to any disclaimer, the term of this patent is extended or adjusted under 35 U.S.C. 154(b) by 526 days.

(21) Appl. No.: 12/700,027

(22) Filed: Feb. 4, 2010

(65) Prior Publication Data
US 2011/0185504 A1    Aug. 4, 2011

(51) Int. Cl.
*A61G 1/13* (2006.01)
(52) U.S. Cl. .................. 5/628; 5/625; 5/626; 5/627
(58) Field of Classification Search ............... 5/625–629
See application file for complete search history.

(56) References Cited

U.S. PATENT DOCUMENTS

| | | | |
|---|---|---|---|
| 1,711,167 A * | 4/1929 | Blake ........................... | 182/230 |
| 2,309,464 A | 1/1943 | Lucci et al. | |
| 2,512,931 A * | 6/1950 | Glover ............................ | 5/625 |
| 2,703,412 A | 3/1955 | Stone | |
| 2,788,530 A | 4/1957 | Ferguson | |
| 3,110,912 A | 11/1963 | Propst | |
| 3,134,110 A | 5/1964 | Gamichon | |
| 3,158,875 A * | 12/1964 | Fletcher ........................... | 5/628 |
| 3,336,060 A | 8/1967 | Bradford | |
| 4,046,393 A | 9/1977 | Vadnais | |
| 4,067,079 A | 1/1978 | Buchman | |
| 4,124,908 A | 11/1978 | Burns et al. | |
| 4,186,453 A | 2/1980 | Burns et al. | |
| 4,283,068 A | 8/1981 | Keyser | |
| 4,347,635 A * | 9/1982 | Eisenhauer ..................... | 441/40 |
| 4,601,075 A | 7/1986 | Smith | |
| 4,627,428 A | 12/1986 | Brooks | |
| 4,736,474 A | 4/1988 | Moran et al. | |
| 4,793,008 A | 12/1988 | Johansson | |
| 5,016,299 A | 5/1991 | Boulanger | |
| 5,050,254 A | 9/1991 | Murphy | |

(Continued)

FOREIGN PATENT DOCUMENTS

| DE | 2263605 A1 | 7/1973 |
|---|---|---|
| EP | 0 165 043 A2 | 12/1985 |

(Continued)

OTHER PUBLICATIONS

Communication: Transmittal of International Search Report and Written Opinion; International Search Report; and Written Opinion for International Patent Application No. PCT/IB2011/000190 mailed Jul. 8, 2011.

*Primary Examiner* — William Kelleher
(74) *Attorney, Agent, or Firm* — Katten Muchin Rosenman LLP

(57) ABSTRACT

An evacuation sled for non-ambulatory patients preferably includes a plastic sheet having a plurality of handholds disposed about left and right side edges of the sheet, each handhold comprising an opening with a plastic reinforcement above the opening. A plurality of patient retention straps are coupled to the plastic sheet and are configured to secure a patient in the plastic sheet when the plastic sheet is curved upward about the patient. A pull strap is coupled through a head of the plastic sheet and is configured to permit a person to drag the patient strapped to the plastic sheet. Preferably, a foot strap is affixed to the head pull strap and coupled to a foot of the plastic sheet. The foot strap is configured to cause, when tension is applied to the head pull strap, at least one portion of the plastic sheet foot to raise upward and at least partially enclose the feet of the patient.

29 Claims, 8 Drawing Sheets

U.S. PATENT DOCUMENTS

| | | |
|---|---|---|
| 5,150,487 A | 9/1992 | Hemphill |
| 5,189,746 A | 3/1993 | Horie |
| 5,249,321 A | 10/1993 | Graf |
| 6,061,853 A * | 5/2000 | Laaksonen et al. ............... 5/625 |
| 6,871,368 B2 * | 3/2005 | Calkin ............................. 5/628 |
| 7,055,190 B2 | 6/2006 | Barth et al. |
| 7,216,378 B2 | 5/2007 | Barth et al. |
| 7,422,220 B2 * | 9/2008 | Walkingshaw et al. ......... 280/18 |
| 7,559,103 B2 | 7/2009 | Barth et al. |
| 7,610,640 B2 | 11/2009 | Post |
| 7,810,820 B2 * | 10/2010 | Wolf et al. ...................... 280/19 |
| 2004/0088794 A1 | 5/2004 | Calkin |
| 2005/0246833 A1 | 11/2005 | Barth et al. |
| 2006/0061050 A1 | 3/2006 | Wolf et al. |
| 2006/0200905 A1 | 9/2006 | Barth et al. |
| 2007/0136950 A1 * | 6/2007 | Zuercher ......................... 5/627 |
| 2007/0278754 A1 | 12/2007 | Walkingshaw et al. |
| 2008/0301876 A1 | 12/2008 | Kenalty et al. |
| 2010/0005593 A1 * | 1/2010 | Bowling et al. ................. 5/627 |
| 2010/0233922 A1 | 9/2010 | Cynamon |
| 2011/0099717 A1 * | 5/2011 | Windauer ........................ 5/627 |
| 2012/0102650 A1 * | 5/2012 | McGlynn ......................... 5/627 |

FOREIGN PATENT DOCUMENTS

| | | |
|---|---|---|
| EP | 0 233 782 A2 | 8/1987 |
| EP | 0301614 A1 | 2/1989 |
| EP | 0 371 525 A1 | 6/1990 |
| GB | 1434832 A | 5/1976 |
| GB | 2030047 A | 4/1980 |
| GB | 1584102 A | 2/1981 |
| GB | 2157558 A | 10/1985 |
| GB | 2182570 A | 5/1987 |
| WO | 86/07253 A1 | 12/1986 |
| WO | 8607253 A1 | 12/1986 |
| WO | 8909039 A1 | 10/1989 |

* cited by examiner

EVACUATION SLED FOR NON-AMBULATORY PATIENTS

BACKGROUND OF THE INVENTION

1. Field of the Invention

The present invention relates generally to rescue and/or evacuation devices (e.g., "sleds") for non-ambulatory or bed-ridden persons. More particularly, the invention relates to such a device in which a patient may be rapidly and securely enclosed before transfer from a hospital bed to a safe location over land or water.

2. Related Art

Evacuation sleds are used by hospitals, assisted living facilities, emergency services, etc, to rapidly and safely evacuate patients from danger zones, such as flood areas. The patient is typically transferred from a bed into the sled, lowered to the floor, and then evacuated by pulling or dragging. An efficient evacuation sled can be deployed and used by a single nurse or other first responder. An evacuation mattress is disclosed in International Application Number PCT/NL 86/00015 published Dec. 18, 1986 under No. WO 86/07253 based on a Netherlands application filed Jun. 12, 1985. The mattress is characterized by belts or ropes to be put around the patient, which are permanently fastened to the mattress. Such a mattress, while very useful, may be relatively expensive to buy, store, and maintain.

Other known devices for evacuating non-ambulatory persons have also included boards or mats to support a patient. For example, U.S. Pat. No. 4,793,008 issued Dec. 27, 1988 to Johansson discloses rigid yet flexible mats for placing under the patient, with straps for securing the patient across the chest and thighs. A relatively complicated rescue transportation device is disclosed in U.S. Pat. No. 4,736,474 issued Apr. 12, 1988 to Moran et al, wherein an inflatable support member and crossed straps are used to secure the person being transported.

A child restraint device with removable semi-rigid support is disclosed in U.S. Pat. No. 4,627,428 issued Dec. 9, 1986 to Brooks. It includes a semi-rigid base and a cover attachable to the base so as to secure the child between the base and the cover. A restraining harness on top of the cover secures the entire arrangement to a transporting device.

There are numerous other patents and patent applications employing rigid or semi-rigid supports and belts or straps to secure the person transported, for example: U.S. Pat. No. 7,422,220, issued Sep. 8, 2008 to Walkingshaw; U.S. Pat. No. 6,871,368, issued Mar. 29, 2005 to Calkin; and U.S. Patent Publication No. 20060061050, published Mar. 23, 2006 to Wolf. One apparent disadvantage to the use of straps or belts is that they could exert undue or excessive pressure on the bodies of some evacuees, such as in the case of recent surgery patients. Another disadvantage that is not obvious is that the use of complicated straps or the like harnesses delays the process of readying the patient for rescue and evacuation such as in the case of a hospital fire. A further problem is the difficulty in securely and reliably gripping the sled for transport. Another disadvantage is that dragging the patient and sled across a rough surface, such as concrete, is difficult for all but the hardiest of nurses.

SUMMARY OF THE INVENTION

In one aspect of the present invention, a patient evacuation sled apparatus includes a semi-rigid plastic sheet having (i) a rounded head end and (ii) a foot end with a rectangular portion projecting therefrom. A plurality of hand holds is disposed along each of left and right sides of the plastic sheet, each hand hold having a reinforcing plastic member disposed on an outer edge of each hand hold. A plurality of patient strap slits is disposed along each of the left and right sides of the plastic sheet. A plurality of patient straps is woven through respective ones of the plurality of patient strap slits, each patient strap comprising fix and release structure configured to releasably couple together to secure a patient on the plastic sheet. The plurality of patient straps and the plurality of patient strap slits are configured to cause the plastic sheet to curve upward into a semi-cylindrical shape when the patient straps are tightened. A plurality of head pull strap slits are disposed substantially on a longitudinal axis of the plastic sheet, with each slit being disposed substantially perpendicular to the longitudinal axis. A head pull strap is woven through the plurality of head pull strap slits and is configured to permit a person to pull the plastic sheet and the patient from the head of the plastic sheet. A plurality of left side foot strap slits is disposed at substantially 30-60 degrees with respect to the longitudinal axis, and a plurality aright side foot strap slits is disposed at substantially 30-60 degrees with respect to the longitudinal axis. At least one foot strap is woven through the plurality of left side foot strap slits and the plurality of right side foot strap slits and coupled to the head pull strap, and configured such that, when tension is applied to the head pull strap, at least a portion of the foot end rectangular portion moves upward to at least partially enclose the feet of the patient.

In another aspect of the present invention, an evacuation sled has a semi rigid plastic sheet having a patient side and a bottom side. A plurality of flotation structures is coupled to the plastic sheet bottom side and configured to support a patient's head above water. A plurality of securement structures are configured to overlie the patient and secure the patient to the patient side of the evacuation sled. A handle structure is disposed at an end of the sled.

In a further aspect of the present invention, an evacuation device includes a flexible plastic material configured to support a person lying thereon, and at least one flotation structure configured to be detachably attached to the flexible plastic material. A plurality of first securement structures is disposed along a first side of the flexible plastic material, and a plurality of second securement structures is disposed along a second side of the flexible plastic material. The first securement structure is configured to be engageable with the second securement structure to enclose the person to the flexible plastic material. A handle structure is disposed at an end of the sled, and the evacuation sled is configured to be rolled into a substantially compact package for storage when not in use.

In yet another aspect of the present invention, an evacuation device has a semi-rigid plastic sheet comprising a plurality of flexible material sections pivotably attached to one another, and configured to support a person lying thereon. At least one flotation structure is detachably coupled to a bottom side of the semi-rigid plastic sheet, as is at least one rolling structure. A plurality of first securement structures is disposed along a first side of semi-rigid plastic sheet, and a plurality of second securement structures is disposed along a second side of semi-rigid plastic sheet. The first securement structure is configured to be engageable with the second securement structure to enclose the person to the semi-rigid plastic sheet. A handle structure is disposed at an end of the sled, and the semi-rigid plastic sheet is configured to be folded along the pivotable attachments into a substantially compact package for storage when not in use.

In another aspect, patient evacuation sled apparatus includes a plastic sheet having a plurality of handholds disposed about left and right side edges of the sheet, each handhold comprising an opening with a plastic reinforcement above the opening. A plurality of patient retention straps are coupled to the plastic sheet and are configured to secure a patient in the plastic sheet when the plastic sheet is curved upward about the patient. A pull strap is coupled through a head of the plastic sheet and is configured to permit a person to drag the patient strapped to the plastic sheet. Preferably, a foot strap is affixed to the head pull strap and coupled to a foot of the plastic sheet. The foot strap is configured to cause, when tension is applied to the head pull strap, at least one portion of the plastic sheet foot to rise upward and at least partially enclose the feet of the patient.

BRIEF DESCRIPTION OF THE DRAWINGS

Certain embodiments of the invention will now be described in detail with reference to the annexed drawings, in which.

DETAILED DESCRIPTION OF THE DISCLOSED EMBODIMENTS

Figure 1:
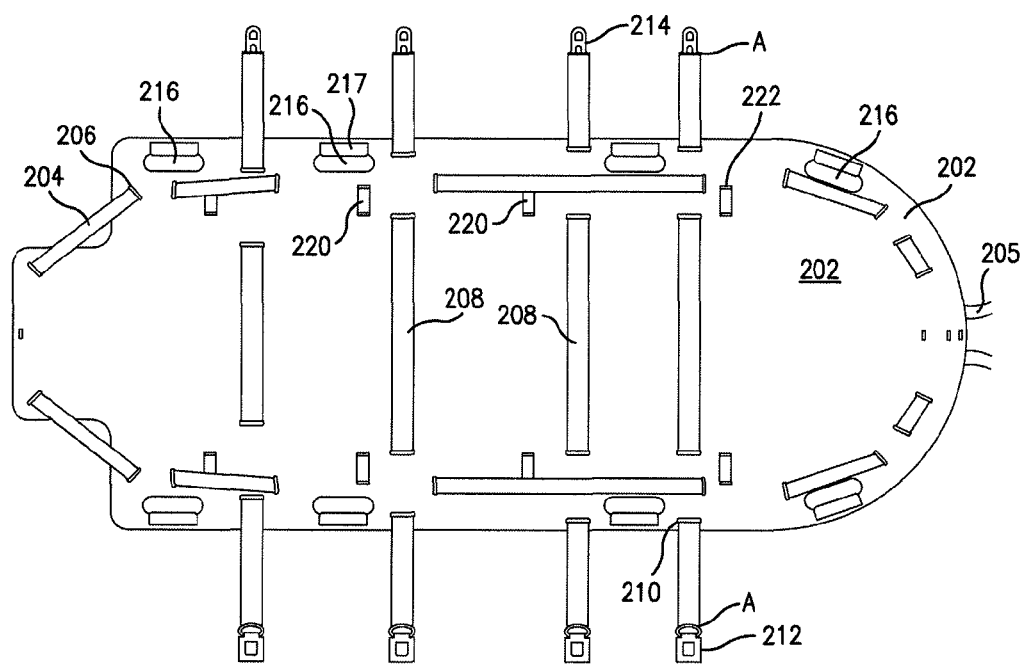
FIG. 1 is a top view of evacuation sled 200 in accordance with one embodiment of the present invention.

A preferred embodiment of the present invention is described with reference to FIG. 1 wherein a floating evacuation sled 200 is shown. The sled 200 preferably comprises a semi flexible base structure 202, preferably made of a sheet of high density polyethylene (HDPE), although any suitable material may be used, such as Kevlar, composites, resins, other high density plastics, etc. The base 202 is sufficiently flexible that it can be rolled into a cylinder for storage and transportation, but sufficiently rigid so that, when curled into a half cylindrical shape, it assumes sufficient rigidity to support an adult (up to 250 lbs.) lying therein The base 202 is preferably about 75 inches to about 100 inches, more preferably about 80 inches to about 95 inches, and most preferably about 85 inches to about 90 inches long, with a width of about 35 inches to about 55 inches, more preferably about 40 inches to about 50 inches, and most preferably about 45 inches to about 48 inches. However, the base 202 could be any suitable size to support a person lying down. As shown in FIG. 1, the head of the base 202 is preferably hemispherical in shape, which will protect the head of a patient lying therein, and provide a skid ramp when the sled and patient are being dragged. The foot portion of the base 202 has a projecting rectangular shape configured to lie over and protect the patient's feet when the base 202 is rolled upward and the foot portion drawn up toward the patent's ankles. Weight is important for such sleds, and rescue sleds should weigh less than about 10 pounds. The preferred sled, including the straps, weighs only about 6 pounds. Such sleds also can be rolled into cylindrical form with a diameter less than about 10 inches. The preferred sled can be rolled into a cylinder less than 6 inches in diameter. The preferred thickness of the HDPE sheet is 0.05 to 0.5 inch thick, more preferably 0.1-0.25 inch thick.

Figure 2:
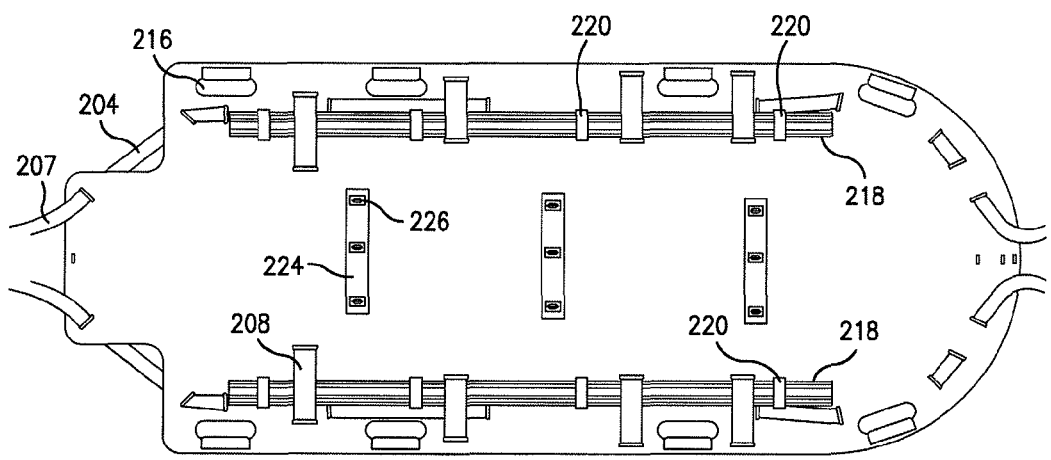
FIG. 2 is a bottom view of evacuation sled 200 in the FIG. 1 embodiment, showing wheel assemblies and floatation devices.

In the embodiment of FIGS. 1 and 2, one or more peripheral straps 204 is disposed around the outer perimeter of the base structure 202, passing through a number of corresponding slits 206. In particular, the peripheral strap 204 is woven into the base 202, going from underneath to on top and back again, by passing through a plurality of slits 206, which are disposed in a spaced apart arrangement around the perimeter of the base 202, about 0.5 inches to about 6 inches, preferably about 1 inches to about 5 inches, most preferably about 2 inches to about 4 inches from the outer edge of the base 202. The slits 206 are sized to accept the strap 204. The peripheral strap 204 is used to give structural rigidity by holding the periphery of the base 202 in its semi-cylindrical shape when the patient is lying therein. The peripheral strap 204 may also be used as a handle or a tie-stricture to assist in transporting the patient.

A head pull strap 205 is disposed at the head of the base 202 for one or more nurses to pull the sled during evacuation. The head pull strap 205 may be an extension of the peripheral strap 204 (as shown in FIG. 1), or may be coupled thereto by stitching, tying, gluing, bolting, velcro-ing, welding, etc. The head pull strap 205 may also be separate from the peripheral strap 204, as will be described more fully below with respect to the embodiments of FIGS. 9 and 11. Preferably, the head pull strap 205 passes through a slit in the base 202, for added securement. A foot pull strap 207 may also be provided at the foot of the base 202, and may be configured and/or arranged as discussed above with respect to the head pull strap 205. The foot pull strap may also include an H-shaped harness for added handles during evacuation.

A plurality (preferably four) of body retaining straps 208 are located substantially transverse to the longitudinal axis of the base structure 202, and are preferably woven into the base structure 202 through slits 210 (in substantially the same way as peripheral strap 204), but with the ends of the body strap 208 extending outwardly from either side of the base structure 202. Attached to either end of the body straps 208 is a fix-and-release structure, such as buckle and tang, clips, ties, Velcro™, etc. Preferably, the fix-and-release structure comprises a female buckle connector 212 and a male buckle tang 214, respectively. Buckle connectors 212 and 214 are configured to be length-adjustable and releasably attachable to each other, in a manner similar to a standard automobile seatbelt buckle or any other suitable device. Preferably, the buckle connectors 212 and 214 are corrosion resistant and unaffected by sea water or fresh water, and their physical properties will remain constant over a wide range of temperature, relative humidity, and weather conditions. The body straps 208 are preferably adjustably attached to one or both of the buckle connectors 212 and 214 so that the length 'A' of the body strap 208 located between the buckle connectors 212 and 214 is adjustable. Of course, the body strap 208 can be fixedly attached to the buckle connectors 212 and 214 and have some other means of adjusting said length 'A' between said buckle connectors.

Around the periphery of the base 202 are a plurality of hand holds 216, used to grip and lift the sled when a patient is lying therein. Each hand hold 216 is a corner-rounded slot approximately 3-6 inches long and 1-3 inches wide. In order to reinforce the hand hold 216, a reinforcing member 217 is adhered to the base 202 immediately above the hand hold 216 hole. Preferably, the reinforcing member 217 is formed by cutting out the bottom and sides of the hand hold 216 and then folding the cut-out portion upward and adhering it to the base 202 by welding, gluing, etc. This provides additional strength to the hand hold 216 and also provides a more comfortable, thicker (2 times thickness) grip for the nurse(s) transporting the patient.

The underside of the sled 200 is shown in FIG. 2. In this embodiment, floatation structures 218 are preferably disposed towards either side of the base 202 and run substantially along the length of the base 202. The floatation structures 218 are preferably detachably attached to the base 202 by straps 220 which pass through slits 222 and around the floatation structures 218 to effectively hold the floatation structures 218 in place. The body straps 204 preferably pass around the floatation structures 218 when they pass to the underside of the base 202. The floatation structures 218 are preferably formed of closed cell foam similar to children's pool toys, though any other material, such as open cell foam, air bladders, air pockets, wood, plastic, or any suitable material can be used to impart the desired buoyancy to the sled 200. In an alternative embodiment, the floatation structures 218 are integral with the base 202.

Figure 3:
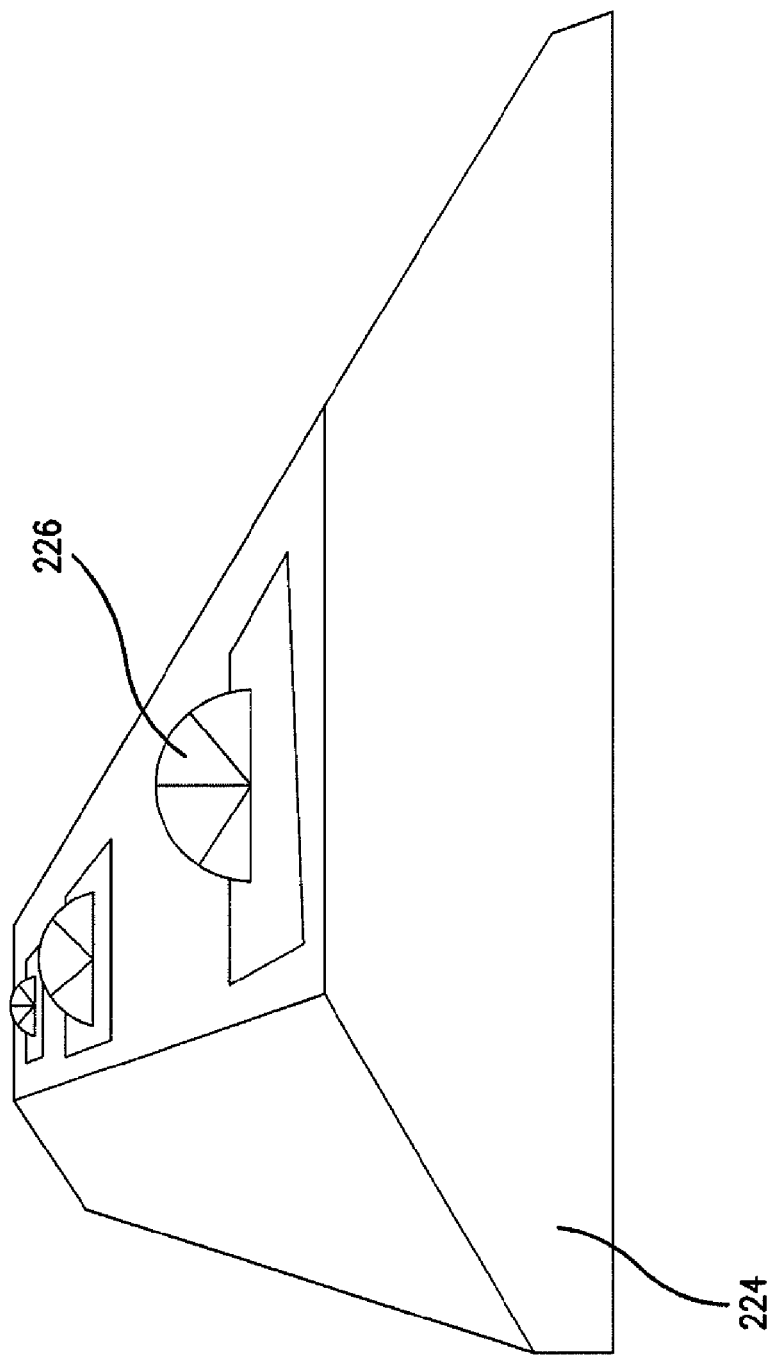
FIG. 3 is a perspective side view of wheel housing 224 in the FIG. 1 embodiment.

In an alternative embodiment, the bottom side of the base 202 includes at least two wheel housings 224 disposed in a spaced-apart relationship to allow the sled to be rolled on the ground or other rough surfaces. With reference to FIG. 3, the wheel housings 224 are preferably have a generally trapezoidal cross section to aid in sliding over obstacles as the sled 200 is pulled during use. The wheel housings 224 preferably comprise a plurality of wheel structures 226. The wheel structures 226 can be any structure known in the art for allowing an object to roll over a surface including but not limited to wheel and axel assemblies, ball bearings, cylindrical members, etc. It will be appreciated by one skilled in the art that the wheel housing 224 and the wheel structures 226 allow the sled 200 to be pulled with greater ease over a surface allowing a bed ridden patient to be evacuated by a single person. Of course, the wheel housings 224 and the wheel structures 226 can be arranged in any configuration and in any number or they can be omitted from the sled 200 altogether. Alternatively, the wheel housings 224 may be detachable from the bottom side of the base 202.

The evacuation device 200 can be rolled-up, toe to head, into a tight cylinder for transportation and/or storage when not in use. The sled 202 has a flexibility that is sufficient to allow the device to be rolled-up repeatedly without substantial fatigue to the structure of the sled 200. To roll the evacuation device 200, the floatation structures 218 are first removed from straps 220 and the body straps 208. The floatation structures 218 are then placed substantially transverse to the base 202 at an end. The body is then rolled from an end with the floatation structures 218 enclosed so that the floatation structures 218 are secured as the base 202 is rolled. The strap 205 can then be looped around the rolled base 202, with the floatation structures 218 inside, so as to secure the base 202 in a rolled position. In an emergency, the evacuation device 200 can be made ready by unfastening the strap 205, unrolling the base 202, and securing the floatation structures 218 in the straps 220 and the body straps 208.

Figure 4:
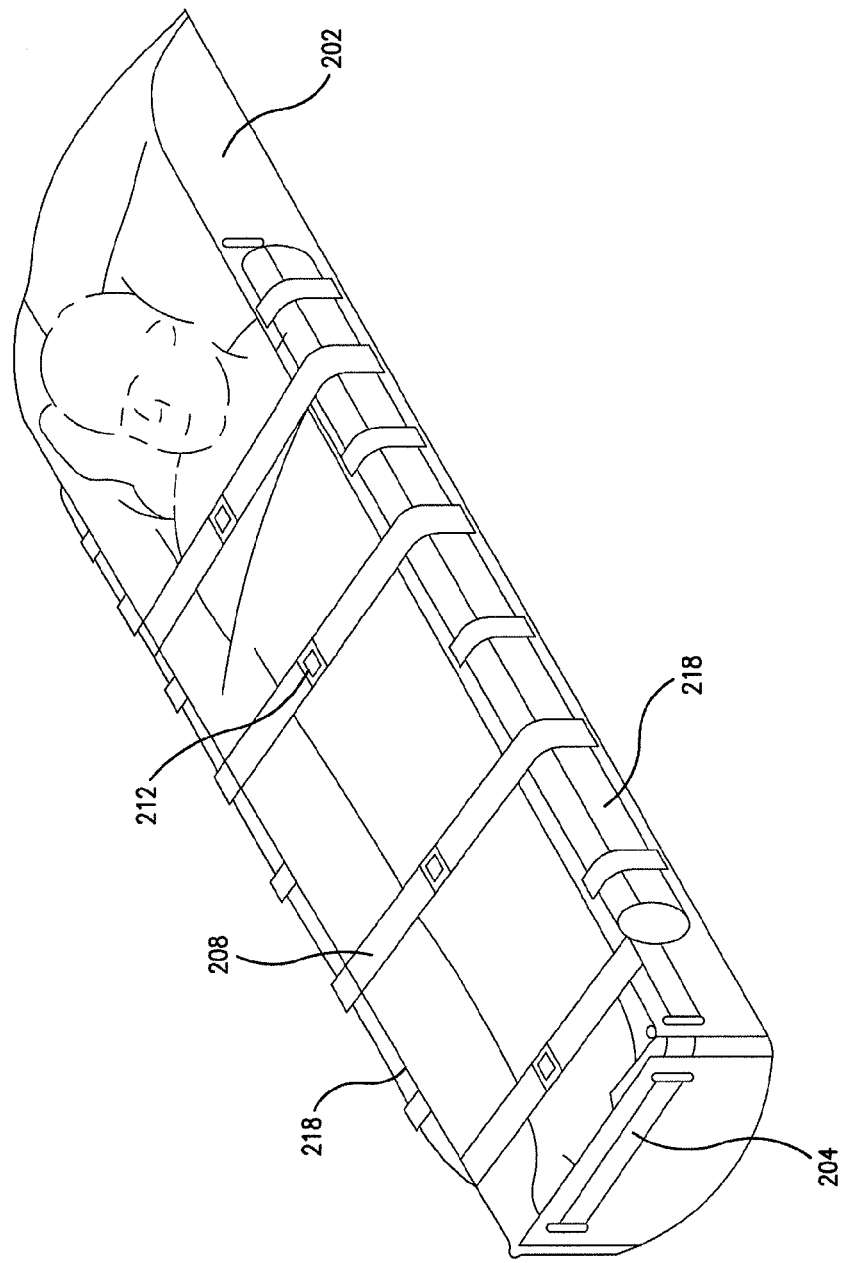
FIG. 4 is evacuation sled 200 in the FIG. 1 embodiment, in use with an evacuee secured in place.

In use, as shown in FIG. 4, once a person is lying on the sled 200, the buckle connectors 212 and 214 can be brought together and attached over the top of the person. Length 'A' can then be adjusted to be sure that the person is secured on top of the sled 200. The strap 205 can then be used to pull and guide the evacuation sled over land or water in order to evacuate the person to a safe location.

In one embodiment of the invention, the buoyancy of the flotation structures 218 is configured so that the head end of sled 200 is more buoyant than the feet end. It will be appreciated by those skilled in the art that this will keep the evacuee at an angle relative to the water with the head of the evacuee kept safely out of the water during an evacuation over water. The relative buoyancy between the head and feet ends of the sled 200 is preferably 60% of total buoyancy towards the head and 40% of total buoyancy towards the feet, more preferably 70% of total buoyancy towards the head and 30% of total buoyancy towards the feet, and most preferably 80% of total buoyancy towards the head and 20% of total buoyancy towards the feet, though any relative buoyancy can be used to keep the evacuee's head at a safe distance above the water level during an evacuation. Relative buoyancy between the head and feet ends of the sled 200 can also be achieved by other means such as ballast weight.

Figure 5:
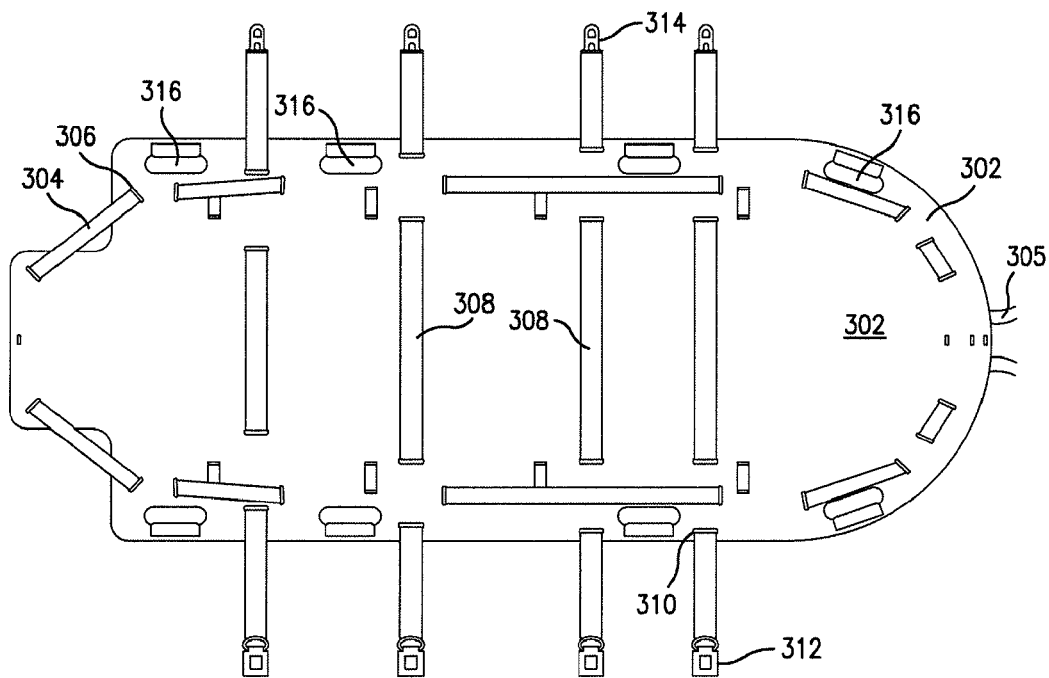
FIG. 5 is a top view of evacuation sled 300 according to a second embodiment of the present invention.
Figure 6:
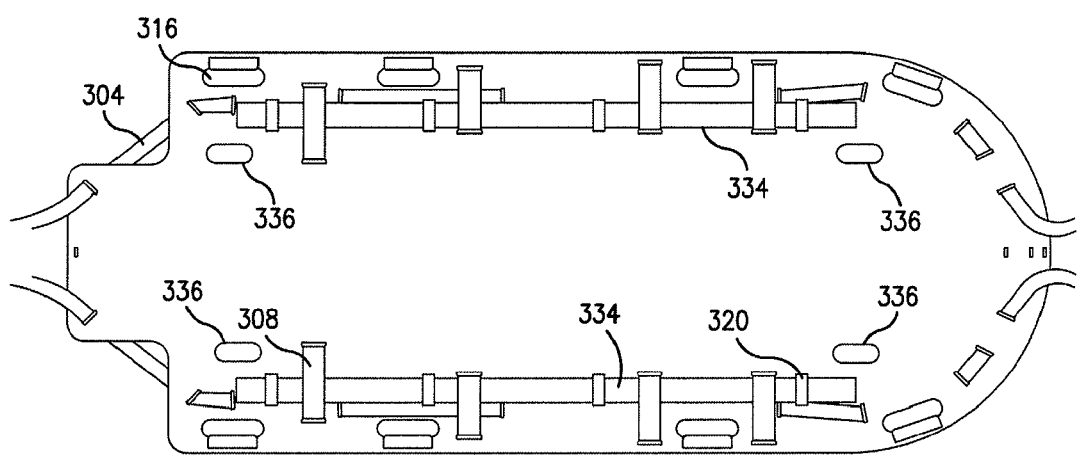
FIG. 6 is a bottom view of evacuation sled 300 in the FIG. 5 embodiment.

With reference to FIGS. 5 and 6, another embodiment of an evacuation device 300 is shown, which is substantially similar to the evacuation device 200 described above, but without the wheel assemblies. Thus, the evacuation device 300 comprises at least one floatation bladder 334, which fulfills substantially the same role as the floatation structures 218 above. The floatation bladder 334 can be made from plastic, fabric, or any other material which can contain a gas, such as air, at a pressure. The floatation bladder 334 is sized so that, when filled with a gas, it has sufficient buoyancy to support the evacuation device 300 and a person lying on top of the evacuation device 300 on water.

The floatation bladders 334 are kept in a flattened deflated state when the evacuation sled 300 is not in use which allows for easier rolling of the evacuation device 300 for storage. The evacuation device 300 further comprises air canisters 336. Air canisters 336 are configured to contain a substantial amount of compressed gas in order to fill the bladders 334 to reach the desired floatation capabilities for evacuation device 300. Again, it will be appreciated that there can be any number of air canisters 336 to contain the necessary volume of air or other gas required to fill the bladders 334. Alternatively, the bladders 334 can be inflated manually by breathing into an inflation tube or by an external pump.

Figure 7:
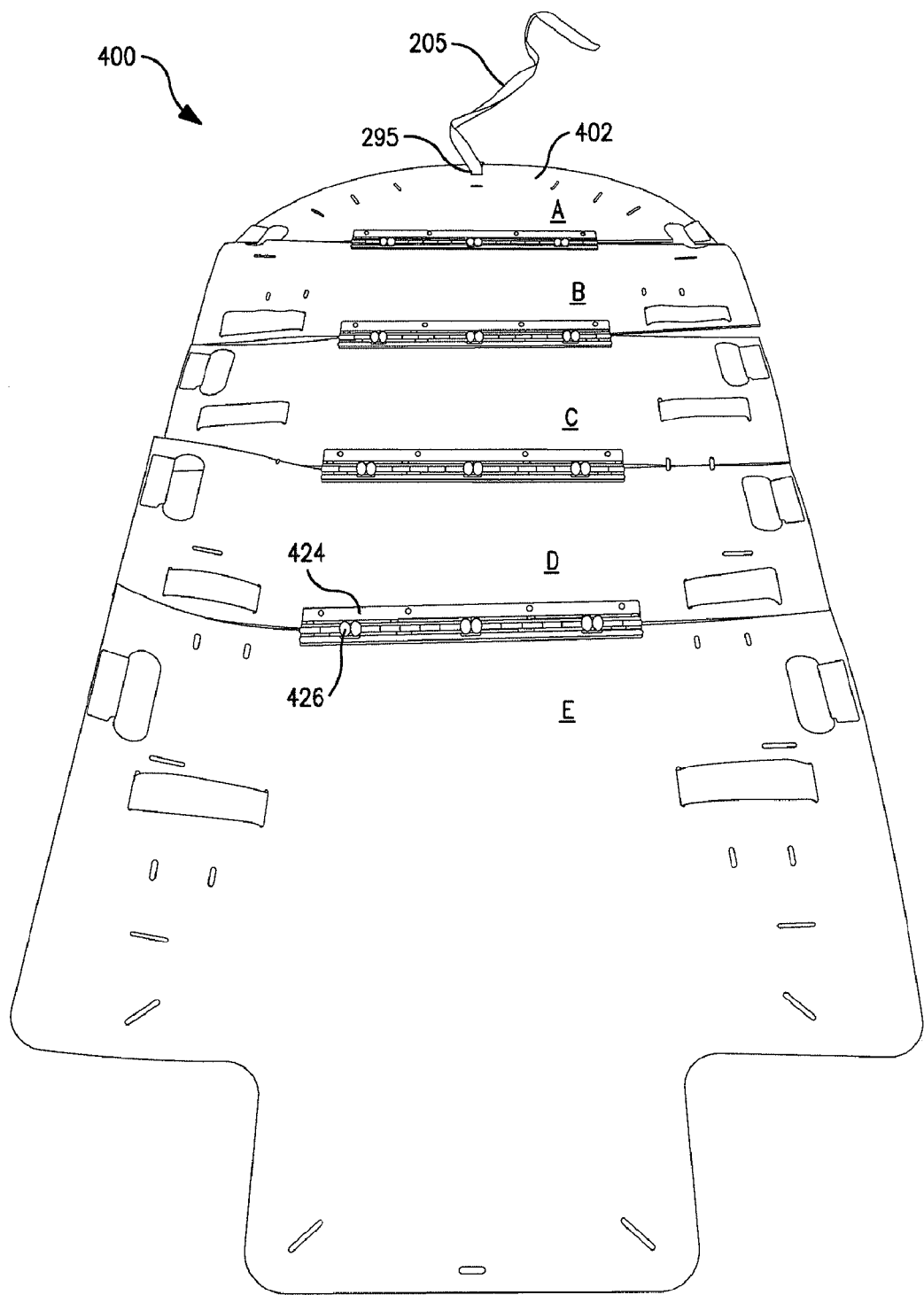
FIG. 7 is a top view of evacuation device 400 in a foldable embodiment according to the present invention.

With reference to FIG. 7, a foldable evacuation device 400 is shown. Evacuation device 400 is substantially similar to evacuation device 200 above, but the base 402 is preferably cut into four equal sections A, B, C, and D, and a larger section E at the foot end of the base 402. The sections are held together by hinge plates 424 which are attached to the base 402 on either side of cuts 422. Hinge plates 424 are pivotable about a central axis allowing the sections of the base 402 attached to either side of the hinge plates 424 to pivot in relation to each other. Alternatively, the sections of the base 402 can be pivotably held together by any other means known in the art including straps, or elastic. The head pull strap 205 in this embodiment is attached directly to the base 202 through a hole or slit 295.

Figure 8:
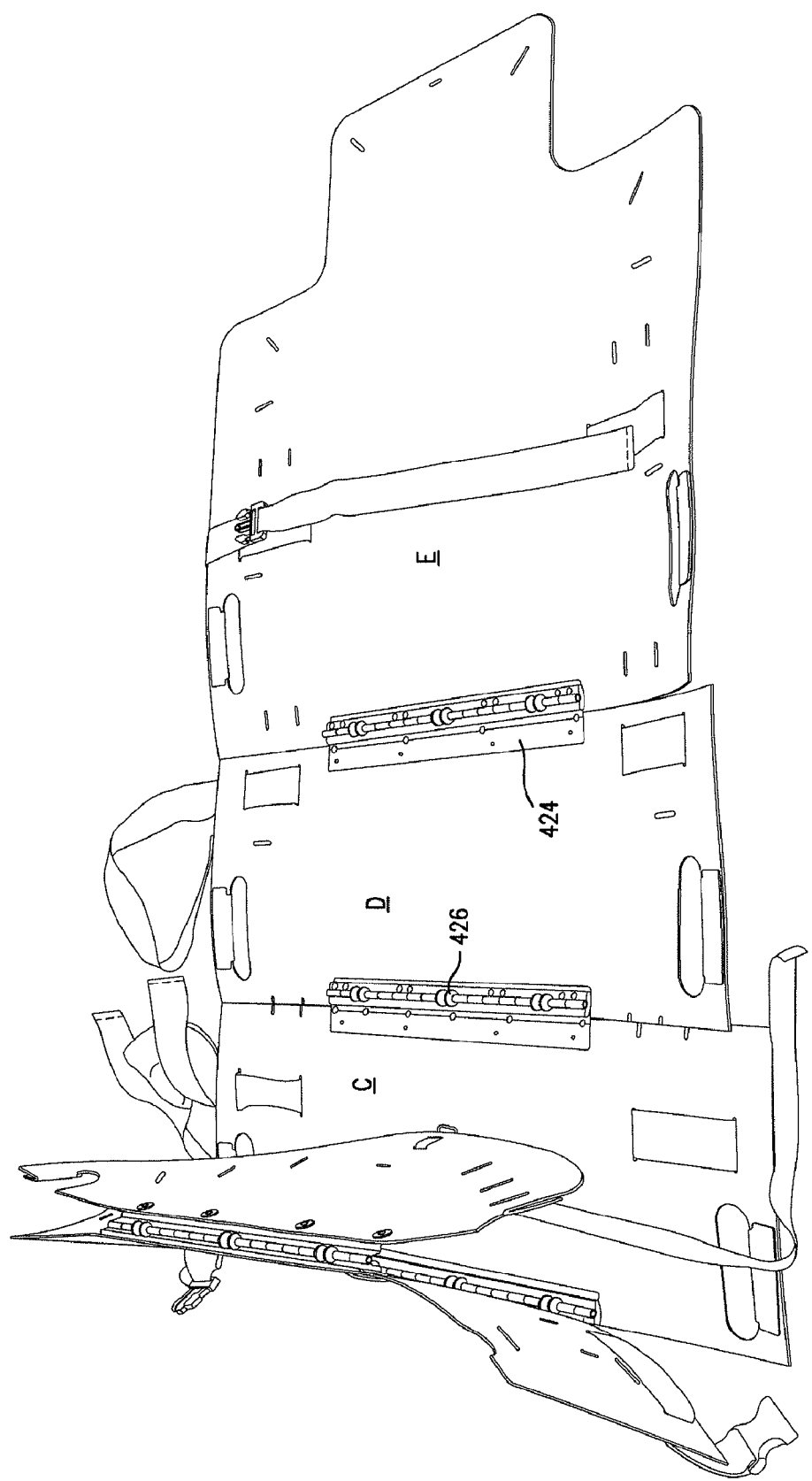
FIG. 8 shows how evacuation device 400 can be folded for storage.

With reference to FIG. 8, the sections of the base 402 can be folded by pivoting section A about the hinge plate 424 until it lays flat on top of the section B. The sections A and B are similarly folded on top of the section C. The process continues until the sections A, B, C, and D are all folded and stacked on the section E. Then, the larger section E can be wrapped around the other sections and secured with straps for storage. In an emergency, the process is reversed and the sled 400 is ready for use.

In another embodiment, the hinge plates 424 comprise optional wheel structures 426 disposed in a spaced relationship along the length of the hinge plates 424. The wheel structures 426 serve substantially the same function as the wheel structures 226 described above. Of course, the wheel structures 426 can be any structure known in the art for allowing an object to roll over a surface, including but not limited to wheel and axel assemblies and ball bearings.

Figure 9:
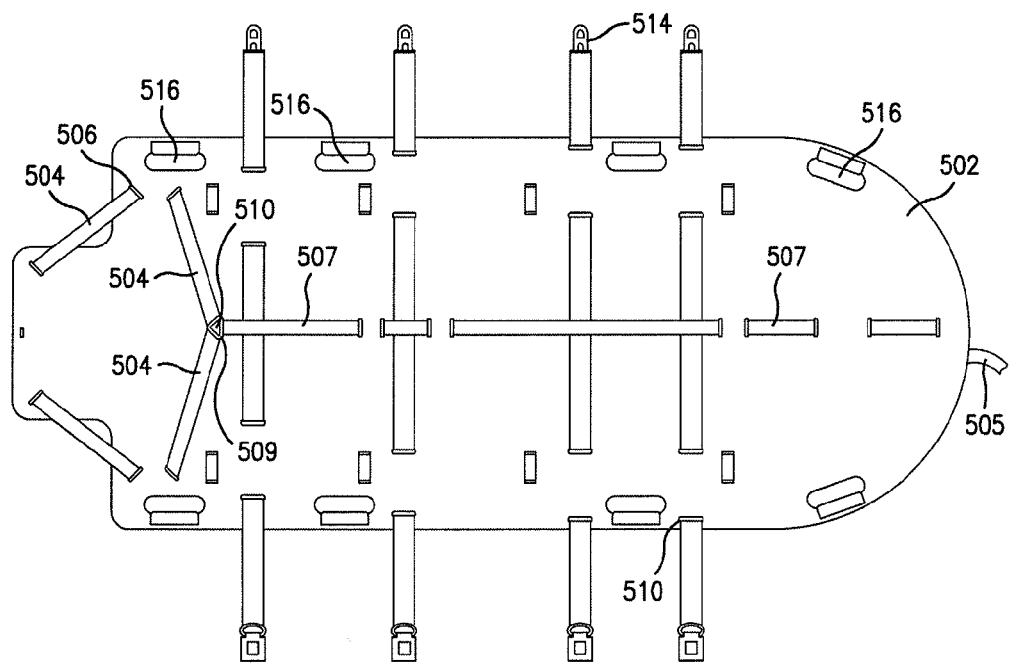
FIG. 9 is a top view of an evacuation sled 500 according to yet another embodiment of the present invention.
Figure 10:
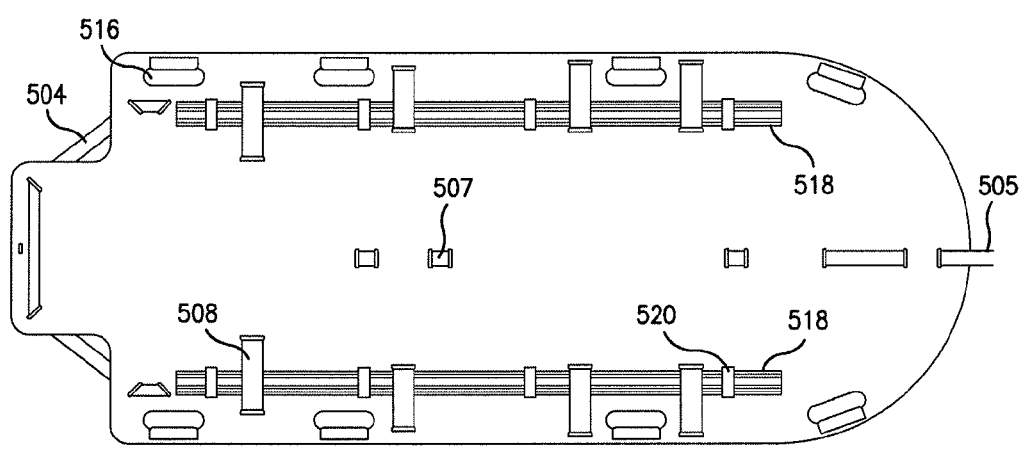
FIG. 10 is a bottom view of the FIG. 9 embodiment.

With reference to FIGS. 9 and 10, an evacuation device 500 with a novel head pull strap 505 is shown. The evacuation device 500 is substantially similar to the evacuation device 200 described above. The evacuation device 500 comprises a foot strap 504, which is woven into the foot end of the base 502 and extends from the outer edges of the foot end of the base 502 towards the center thereof, where the two ends of the foot strap 504 meet at a junction 509. The two ends of the strap 504 are secured together at the junction 509 using a ring 510, stitching, welding, gluing, or some other means of attachment. Also attached to the ring 510 is a longitudinal strap 507. The ring 510 can be metal, plastic, or any other material to provide the proper strength to hold the straps 504 and 507 together. The strap 507 is disposed down the center of the base 502 substantially along its longitudinal axis, and extends from the ring 510 to the head end of the base 502. The strap 507 is woven into the base 502 in a substantially similar manner as the peripheral strap 204 in the FIG. 1 embodiment described above. The strap 507 extends to the head end of the base 502 where it connects to or is integral with the head pull strap 505, which serves substantially the same purpose as the head pull strap 205 described above.

With this unique structure, when the head pull strap 505 is pulled, it also pulls on the strap 504, causing the rectangular projection at the foot of the sled to pull upward to cover at least a portion of the bottoms and/or sides and/or tops of the feet of the patient. Thus, the drag weight of the patient will be supported more by the patient's feet, which is more natural and more safe than supporting the patent's drag weight with straps. At the same time, the tension on the strap 504 causes the left and right side portions of the foot of the base 502 to also pull upward, enclosing the sides of the feet of the patient, adding extra security to the patient. When tension on the head pull strap 505 is relaxed, the bottom portions of the base 502 may return to their original positions allowing ready access to the lower body of the patient. Preferably, the foot strap 504 is woven to the base 502 with a plurality of slits 506 which are disposed non-parallel and non-perpendicular to a longitudinal axis of said plastic sheet. Preferably, the slits 506 comprise three slits on each side, each disposed at an angle of 30-60 degrees with respect to the longitudinal axis of the base 502, even more preferably at an angle of substantially 45 degrees with respect to the longitudinal axis of the base 502.

As with the other embodiments described above, the embodiment of FIGS. 9 and 10 may have flotation devices 518, or not. Wheel assemblies and/or hinges may also be provided, as described above with respect to FIGS. 1-4 and 7-8.

Figure 11:
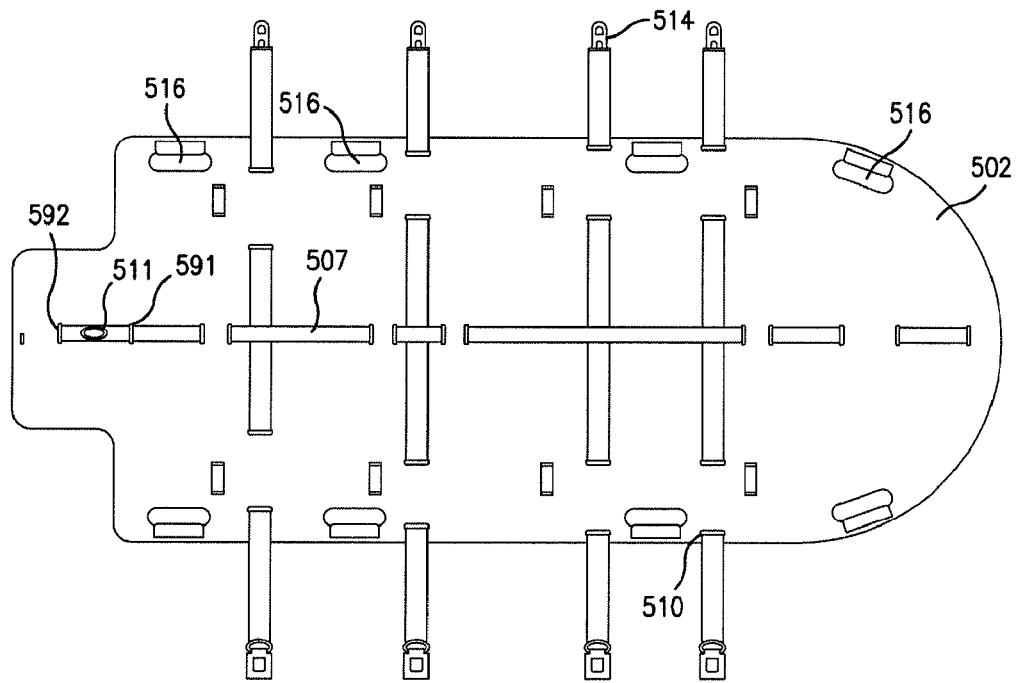
FIG. 11 is a top view of evacuation sled 600 according to a further embodiment of the subject invention.
Figure 12:
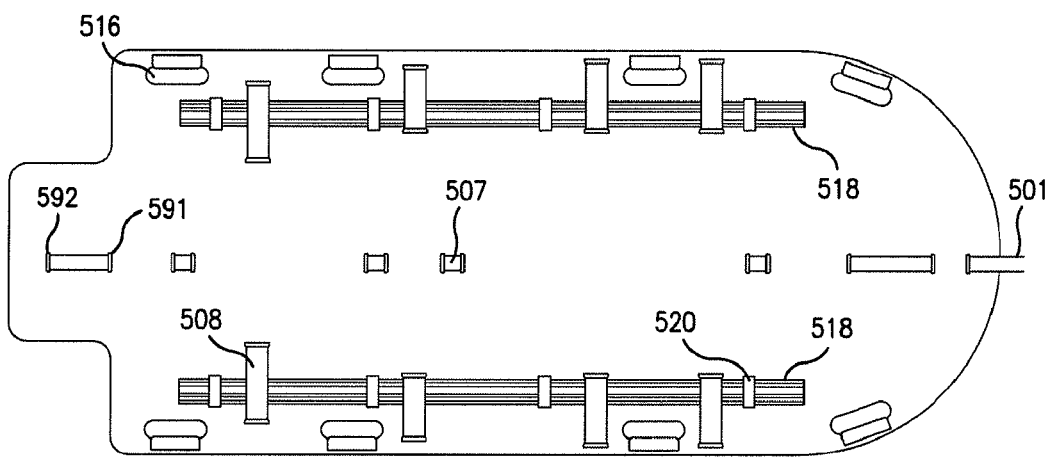
FIG. 12 is a bottom view of the FIG. 11 embodiment.

In yet another embodiment shown in FIGS. 11-12, the strap 504 is omitted and instead the strap 507 extends substantially all the way to the foot end of the base 502. The end of the strap 507 passes through slits 591 and 592, and is then turned back on itself and secured to a lower portion of the strap 507 by the ring 511, stitching, welding, gluing, or some other means of attachment. The ring 511 can be metal, plastic, cloth, or any other material to provide the proper strength to hold the straps 507 together. When the head pull strap 505 is pulled, it pulls the strap 507, which raises the rectangular projecting portion of the foot of the base 502, thus enclosing the tops and/or bottom and/or sides of the feet of the patient.

Thus, what has been described are a number of evacuation sled embodiments that are inexpensive to manufacture, efficient to store, and easy to use, yet which will protect the patient during transport.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A patient evacuation sled apparatus, comprising:
    a semi-rigid plastic sheet having (i) a rounded head end and (ii) a foot end with a rectangular portion projecting therefrom;
    a plurality of hand holds disposed along each of left and right sides of said plastic sheet, each hand hold having a reinforcing plastic member disposed on an outer edge of said each hand hold;
    a plurality of patient strap slits disposed along each of the left and right sides of said plastic sheet;
    a plurality of patient straps woven through respective ones of said plurality of patient strap slits, each patient strap comprising fix and release structure configured to releasably couple to secure a patient on said plastic sheet, said plurality of patient straps and said plurality of patient strap slits being configured to cause said plastic sheet to curve upward into a semi-cylindrical shape when said patient straps are tightened;
    a plurality of head pull strap slits disposed substantially on a longitudinal axis of said plastic sheet, with each slit being disposed substantially perpendicular to said longitudinal axis;
    a head pull strap woven through the plurality of head pull strap slits and configured to permit a person to pull said plastic sheet and the patient from the head of said plastic sheet;
    a plurality of left side foot strap slits disposed at substantially 30-60 degrees with respect to said longitudinal axis, and a plurality of right side foot strap slits disposed at substantially 30-60 degrees with respect to said longitudinal axis; and
    at least one foot strap woven through said plurality of left side foot strap slits and said plurality of right side foot strap slits and coupled to said head pull strap, and configured such that, when tension is applied to said head pull strap, at least a portion of said foot end rectangular portion moves upward to at least partially enclose the feet of the patient.

2. Apparatus according to claim 1, wherein said at least one foot strap, said plurality of left side foot strap slits, and said plurality of right side foot strap slits are configured such that, when tension is applied to said head pull strap, at least a portion of a lower left side portion of said plastic sheet and at least a portion of a lower right side portion of said plastic sheet move upward to at least partially enclose the feet of the patient.

3. Apparatus according to claim 1, further comprising a foot pull strap coupled to said foot strap and configured to permit a person to pull said plastic sheet and the patient from the foot of said plastic sheet.

4. Apparatus according to claim 1, wherein at least two portions of said foot strap are disposed at substantially 30-60 degrees with respect to said longitudinal axis.

5. Apparatus according to claim 1, further comprising a plurality of wheel assemblies disposed on a bottom surface of said plastic sheet.

6. Apparatus according to claim 1, further comprising a plurality of flotation devices disposed on a bottom surface of said plastic sheet.

7. Apparatus according to claim 1, further comprising a plurality of hinge devices disposed on said plastic sheet and configured to permit said plastic sheet to be folded along each of said plurality of hinges.

8. An evacuation sled comprising:
a semi rigid plastic sheet having a patient side and a bottom side, and having a head end with a head pull strap and a foot end with a foot strap;
a plurality of securement structures configured to overlie said patient and secure said patient to said patient side of said evacuation sled;
the foot strap affixed to the head pull strap and coupled to the foot end of said plastic sheet, said foot strap being configured to cause, when tension is applied to said head pull strap, at least one portion of said plastic sheet foot to raise upward and at least partially enclose the feet of the patient; and
a handle structure disposed at an end of the sled.

9. The evacuation sled as claimed in claim 8, further comprising a plurality of flotation structures coupled to said plastic sheet bottom side and configured to support a patient's head above water, and wherein each said floatation structure comprises closed cell foam.

10. The evacuation sled as claimed in claim 8, further comprising a plurality of flotation structures coupled to said plastic sheet bottom side and configured to support a patient's head above water, and wherein each said floatation structure comprises open cell foam.

11. The evacuation sled as claimed in claim 8, further comprising a plurality of flotation structures coupled to said plastic sheet bottom side and configured to support a patient's head above water, and wherein said floatation structure comprises an inflatable bladder.

12. The evacuation sled as claimed in claim 8, further comprising a plurality of flotation structures coupled to said plastic sheet bottom side and configured to support a patient's head above water, and wherein said floatation structure is integral with the plastic sheet.

13. The evacuation sled as claimed in claim 8, wherein the plastic sheet comprises a flexible material and is configured to be rolled up for storage when not in use.

14. The evacuation sled as claimed in claim 8, further comprising a plurality of flotation structures coupled to said plastic sheet bottom side and configured to support a patient's head above water, and wherein each floatation structure is configured to be detachably attached to said plastic sheet.

15. An evacuation device comprising:
a flexible plastic material configured to support a person lying thereon, and having a head end with a head pull strap and a foot end with a foot strap;
a plurality of first securement structures disposed along a first side of the flexible plastic material;
a plurality of second securement structures disposed along a second side of the flexible plastic material;
said first securement structure being configured to be engageable with said second securement structure to enclose said person to said flexible plastic material;
a handle structure disposed at an end of the sled;
the foot strap affixed to the head pull strap and coupled to the foot end of said plastic material, said foot strap being configured to cause, when tension is applied to said head pull strap, at least one portion of said plastic material foot to raise upward and at least partially enclose the feet of the patient; and
the evacuation sled being configured to be rolled into a substantially compact package for storage when not in use.

16. The evacuation device as claimed in claim 15, further comprising at least one flotation structure configured to be detachably attached to the flexible plastic material, and wherein each said floatation structure comprises closed cell foam.

17. The evacuation device as claimed in claim 15, further comprising at least one flotation structure configured to be detachably attached to the flexible plastic material, and wherein said floatation structure is configured to have 80% of total buoyancy towards the head end of the evacuation device.

18. The evacuation device as claimed in claim 15, wherein the flexible plastic material comprises a plurality of distinct sections coupled together.

19. The evacuation device as claimed in claim 18, wherein the distinct sections are pivotably attached to one another.

20. The evacuation device as claimed in claim 19, wherein said pivotable attachments comprise hinge structure, said hinge structure further comprising a plurality of rolling structures.

21. The evacuation device as claimed in claim 15, further comprising a plurality of rolling structures disposed on a bottom side of said flexible plastic material.

22. The evacuation device as claimed in claim 21, wherein the rolling structure comprises wheel and axel assemblies.

23. An evacuation device comprising:
a semi-rigid plastic sheet comprising a plurality of flexible material sections pivotably attached to one another, and configured to support a person lying thereon, said semi-rigid plastic sheet having a head end with a head pull strap and a foot end with a foot strap;
at least one rolling structure coupled to the bottom side of said semi-rigid plastic sheet;
a plurality of first securement structures disposed along a first side of semi-rigid plastic sheet;
a plurality of second securement structures disposed along a second side of semi-rigid plastic sheet;
said first securement structure being configured to be engageable with said second securement structure to enclose said person to said semi-rigid plastic sheet;
a handle structure disposed at an end of the sled;
the foot strap affixed to the head pull strap and coupled to the foot end of said plastic material, said foot strap being configured to cause, when tension is applied to said head pull strap, at least one portion of said plastic material foot to raise upward and at least partially enclose the feet of the patient; and
said semi-rigid plastic sheet being configured to be folded along said pivotable attachments into a substantially compact package for storage when not in use.

24. Patient evacuation sled apparatus, comprising;
- a plastic sheet having a plurality of handholds disposed about left and right side edges of said sheet, each handhold comprising an opening with a plastic reinforcement above said opening;
- a plurality of patient retention straps coupled to said plastic sheet and configured to secure a patient in said plastic sheet when said plastic sheet is curved upward about the patient;
- a pull strap coupled to a head of said plastic sheet and configured to permit a person to drag the patient strapped to the plastic sheet; and
- a foot strap affixed to the head pull strap and coupled to a foot of said plastic sheet, said foot strap being configured to cause, when tension is applied to said head pull strap, at least one portion of said plastic sheet foot to raise upward and at least partially enclose the feet of the patient.

25. Apparatus according to claim 24, wherein said head pull strap and said foot strap are each coupled to said plastic sheet by being woven into said plastic sheet through a respective plurality of slits therein, and wherein, when said tension is applied to said head pull strap, said foot strap moves with respect to at least one respective slit in said plastic sheet.

26. Apparatus according to claim 24, wherein said foot strap is woven to said plastic sheet with a plurality of foot strap slits which are disposed non-parallel and non-perpendicular to a longitudinal axis of said plastic sheet.

27. Apparatus according to claim 26, wherein, when tension is applied to said head pull strap, said foot strap and said foot strap slits cause a foot portion and left and right lower side portions of said plastic sheet to move upward and at least partially enclose the bottom and sides of the feet of the patient.

28. Apparatus according to claim 26, further comprising a ring which couples said foot strap to said head pull strap.

29. Apparatus according to claim 24, further comprising a flotation device coupled to a bottom surface of said plastic sheet.

* * * * *